(12) United States Patent
Kerrick (10) Patent No.: US 9,990,603 B2
(45) Date of Patent: Jun. 5, 2018

(54) PRODUCT INVENTORY SYSTEM

(71) Applicant: Autodesk, Inc., San Rafael, CA (US)

(72) Inventor: Heather Kerrick, Oakland, CA (US)

(73) Assignee: Autodesk, Inc., San Rafael, CA (US)

( * ) Notice: Subject to any disclaimer, the term of this patent is extended or adjusted under 35 U.S.C. 154(b) by 403 days.

(21) Appl. No.: 14/720,559

(22) Filed: May 22, 2015

(65) Prior Publication Data

US 2016/0342937 A1 Nov. 24, 2016

(51) Int. Cl.
*G06Q 30/00* (2012.01)
*G06Q 10/08* (2012.01)
*G06Q 30/06* (2012.01)

(52) U.S. Cl.
CPC ....... *G06Q 10/087* (2013.01); *G06Q 30/0643* (2013.01)

(58) Field of Classification Search
CPC ........ G06Q 30/00; G06Q 10/08; G06F 17/30; H04W 24/00
USPC ......... 705/28; 235/358; 707/740; 455/456.3; 345/158
See application file for complete search history.

(56) References Cited

U.S. PATENT DOCUMENTS

| | | | | |
|---|---|---|---|---|
| 8,219,558 B1* | 7/2012 | Trandal | ................ | G06Q 10/087 707/736 |
| 8,423,548 B1* | 4/2013 | Trandal | ................ | G06Q 10/087 707/736 |
| 8,532,675 B1* | 9/2013 | Pasquero | .......... | H04M 1/72572 345/158 |
| 8,694,501 B1* | 4/2014 | Trandal | ................ | G06Q 10/087 707/736 |
| 9,171,278 B1* | 10/2015 | Kong | .................... | G06Q 10/087 |
| 9,171,341 B1* | 10/2015 | Trandal | ................ | G06Q 10/087 |
| 9,262,681 B1* | 2/2016 | Mishra | ............... | G06K 9/00771 |
| 2008/0144880 A1* | 6/2008 | DeLuca | .................... | G06T 7/20 382/100 |
| 2009/0059270 A1* | 3/2009 | Opalach | .................. | G06K 9/00 358/1.15 |
| 2009/0060349 A1* | 3/2009 | Linaker | .............. | G06K 9/00664 382/209 |
| 2009/0063307 A1* | 3/2009 | Groenovelt | .......... | G06Q 10/087 705/28 |

(Continued)

*Primary Examiner* — Oluseye Iwarere
(74) *Attorney, Agent, or Firm* — Fish & Richardson P.C.

(57) ABSTRACT

Methods, systems, and apparatus include computer programs encoded on a computer-readable storage medium, including a method for identifying, inventorying and managing physical possessions. Image data is captured including one or more images or video of physical possessions of a person that occupy a space. The captured image data is automatically analyzed to recognize physical products included in the image data and to determine a position of each recognized physical product in the space. The recognized physical products are automatically inventoried including preparing a list of products. Each entry in the list includes a product name or identifying information and location information for where the product is located in the space. A representation of the space is generated including respective physical products. A user interface is provided for presenting the inventory including providing the representation of the space and displaying a representation of respective physical products in the space.

20 Claims, 3 Drawing Sheets

(56) References Cited

U.S. PATENT DOCUMENTS

| | | | |
|---|---|---|---|
| 2009/0285483 A1* | 11/2009 | Guven | G06Q 30/016 382/181 |
| 2011/0246330 A1* | 10/2011 | Tikku | G06F 17/30247 705/27.1 |
| 2012/0037700 A1* | 2/2012 | Walji | G06Q 10/087 235/385 |
| 2012/0183185 A1* | 7/2012 | Grigsby | G06F 17/30256 382/128 |
| 2012/0246027 A1* | 9/2012 | Martin | G06Q 30/00 705/26.63 |
| 2013/0117269 A1* | 5/2013 | Sacco | G06F 17/30247 707/740 |
| 2014/0003727 A1* | 1/2014 | Lortz | G06Q 10/087 382/218 |
| 2014/0156459 A1* | 6/2014 | Zises | G06Q 30/0623 705/26.61 |
| 2014/0214628 A1* | 7/2014 | Argue | G06Q 30/0643 705/27.1 |
| 2014/0244392 A1* | 8/2014 | Chang | G06Q 10/087 705/14.58 |
| 2014/0363059 A1* | 12/2014 | Hurewitz | G06Q 30/0201 382/118 |
| 2015/0019391 A1* | 1/2015 | Kumar | G07G 1/0036 705/28 |
| 2015/0026019 A1* | 1/2015 | Lekas | G06Q 30/0623 705/28 |
| 2015/0026156 A1* | 1/2015 | Meek | G06F 17/30705 707/722 |
| 2015/0066712 A1* | 3/2015 | Altieri | B25J 11/00 705/28 |
| 2015/0095228 A1* | 4/2015 | Su | G06Q 20/12 705/44 |
| 2015/0120505 A1* | 4/2015 | Deshpande | G06Q 30/0623 705/26.61 |
| 2015/0262280 A1* | 9/2015 | Cypher | G06Q 30/0251 705/26.61 |
| 2015/0262286 A1* | 9/2015 | Cypher | G06Q 30/0251 705/26.61 |
| 2015/0379576 A1* | 12/2015 | Otis | G06O 30/0261 705/14.53 |
| 2016/0180602 A1* | 6/2016 | Fuchs | G06F 3/012 463/31 |
| 2016/0314512 A1* | 10/2016 | Kraft | G06Q 30/0627 |
| 2016/0342937 A1* | 11/2016 | Kerrick | G06Q 10/087 |
| 2017/0032313 A1* | 2/2017 | McCullough | G06Q 10/087 |

* cited by examiner

PRODUCT INVENTORY SYSTEM

BACKGROUND

This specification relates to identifying, inventorying and managing items.

People may own or store several possessions, including electronics, furniture, housewares, durable goods, non-durable goods, antiques/collectibles, art, and various other products. The products may fill one or more rooms in a home or may be stored in a garage, a shed, a container or a storage facility. People may take photos or video of their possessions in order to make a record of what they own (or rent).

SUMMARY

In one aspect, a method is provided that captures image data including one or more images or video of physical possessions of a person that occupy a space. The method includes automatically analyzing the captured image data to recognize physical products included in the image data and automatically analyzing the captured image data to determine a position of each recognized physical product in the space. The method further includes automatically inventorying the recognized physical products including preparing a list of products, wherein each entry in the list includes a product name or identifying information and location information for where the product is located in the space. The method includes generating a representation of the space including respective physical products and providing a user interface for presenting the inventory including providing the representation of the space and displaying a representation of respective physical products in the space.

Aspects of the invention may include one or more of the following features. The method can include storing an inventory including the list as a snapshot in association with a date of inventory and repeating the capturing, analyzing, inventorying and generating at one or more additional times including storing a new or delta snapshot in association with a date associated with a respective one of the one or more additional times. The space can be a residence, and wherein the location information includes information for where the physical product is kept in the residence. The method can further include, after the analyzing the captured image data to recognize physical products, automatically retrieving augmentation information associated with the recognized physical products and storing the augmentation information in association with the list, and wherein providing the user interface includes providing a control to expose the augmentation information. The augmentation information can include one or more of a model number, a source or an origin of a respective physical product, a price and/or a value of the respective physical product, specification information related to the respective product, replacement information, product description, size and dimension information, color and style information, weight information, an age and ownership date of the respective product, and warranty information. The method can further include receiving user input including an identification of a physical product and location information for where the physical product is located in the space. The method can further include determining that a product included in the list needs to be replaced and determining a replacement solution, wherein the replacement solution is selected from the group of ordering a replacement, having a replacement manufactured, or modeling a replacement. The method can further include publishing an inventory of the space to a user that is not an owner of the physical products. The method can further include providing a marketplace for viewing inventories of others. The method can further include receiving selection of the list or a portion of the list, identifying a different space, generating a representation of the different space, determining a layout for the recognized products in the different space based on respective locations of the recognized products in the space, providing in the user interface the representation of the different space, and displaying a representation of respective physical products in the different space. The method can further include receiving an indication to package one or more of the recognized products, identifying one or more containers that are sized to receive the one or more recognized products, determining which of the one or more recognized products can be included in a respective individual container, providing instructions for packing the one or more containers, and providing a packing list for each individual container. The method can further include evaluating purchase history information for the person, determining products purchased by the person, and adding purchased products to the inventory automatically after completing a purchase. The method can further include determining one or more recommendations to provide to the person based on the analyzing, including determining one or more additional products, one or more replacement products, or one or more related products to recommend to the person.

Particular implementations may realize none, one or more of the following advantages. A record of possessions of one or more users may be easily captured and processed where processing includes identifying individual products and locating augmentation information to be stored along with a product identifier in an inventory list. Augmentation information can include price information, date of acquisition, replacement information, warranty information, value, product specifications (including dimensions and weight) and other information that is ancillary to the product identification but may be helpful when later attempting to replace, value, store, move, or otherwise process a product. The inventory list can be used for other purposes, such as in coordination with moving or storing one or more products in the inventory list. For example, a group of products from the inventory list can be identified and shipping/packaging instructions can be automatically generated based on information stored in the inventory. Suggestions for which items to package in a given container can be generated, such as based on physical characteristics of a given product. A packaging/inventory list can be created as well for the respective individual containers or sub-spaces identified. Other uses of the inventory information are possible.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Systems, methods, and computer program products are described for identifying, inventorying and managing items, e.g., products and other possessions of a person or a business. For example, a user can capture images (e.g., still image or video) of physical possessions that occupy a space, e.g., a room or other area in a residence, a storage locker, a portable storage unit, a business or some other area. The captured image data can be automatically analyzed to recognize physical products included in the image data, such as furniture and other belongings in a room. A position of each recognized physical product in the space can also be determined. A product inventory can automatically be generated from the recognized physical products, e.g., to produce a list of products. Each entry in the inventory can include a product name, other identifying information, and location information that identifies where the product is located in the space. A representation of the space can be generated that includes respective physical products in the space being represented, e.g., for the user to see a display showing items and their positions in a room. A user interface is provided for presenting the inventory, including the representation of the space and displaying a representation of respective physical products in the space.

Figure 1:
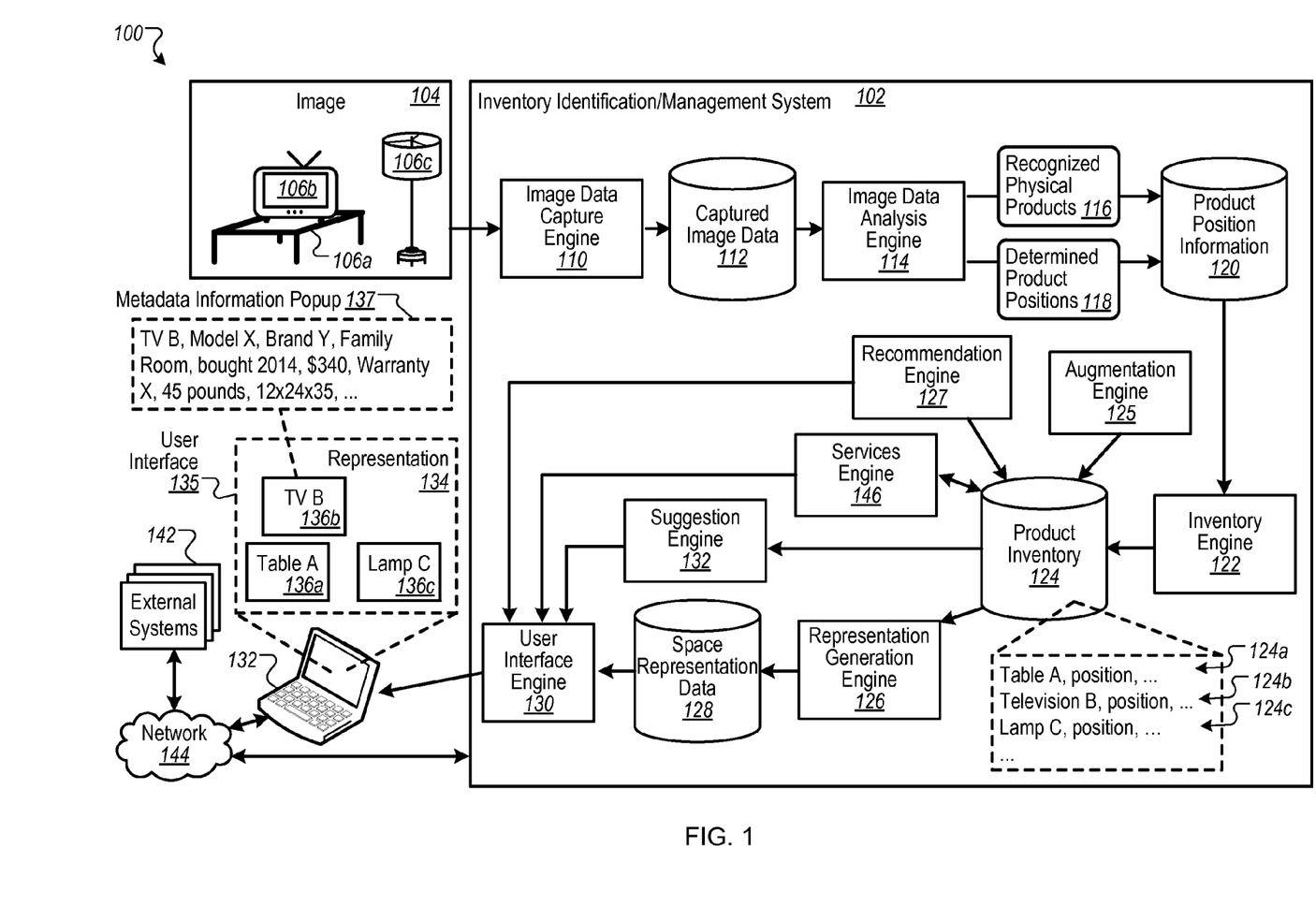
FIG. 1 is a block diagram of an example environment for identifying, inventorying and managing items.

FIG. 1 is a block diagram of an example environment 100 for identifying, inventorying and managing items. For example, the items can be personal property stored or located in a space, such as a room in a person's home. The example environment 100 includes an inventory identification/management system 102 for capturing image data associated with the items, analyzing the captured image data, and inventorying the items using, among other things, product position information determined in the analysis. The example environment 100 includes a network 144, such as a local area network (LAN), a wide area network (WAN), the Internet, or a combination thereof. The network 144 connects the inventory identification/management system 102 to external systems 142, and at least one user device 132 (e.g., laptop computer, tablet computer, wearable computer, mobile device, or any other computing device). The user device 132 can, for example, provide image data to the inventory identification/management system 102 (e.g., through an interface) or present a user interface for interacting with the inventory identification/management system 102, including displaying a representation of items stored in an area.

In some implementations, the inventory identification/management system 102 can be of the form of an application on a device or a service such as embodied in a website, for example, that receives image data from a user's computer/device and provides information and/or services to the user using information from a stored product inventory. In some implementations, the inventory identification/management system 102 can be an application that executes on the user's computer or mobile device. In some implementations, components of the inventory identification/management system 102 can be distributed to the user's various computing devices (e.g., components for capturing images of a room, and components for reviewing inventory at a later time).

In some implementations, a user (such as a homeowner) can use the user device 132 to interact with the inventory identification/management system 102. For example, the user can use the user device 132 (e.g., a camera-equipped mobile phone, a still camera, a video camera, tablet or other electronic device) to provide or upload image data to the inventory identification/management system 102. The user can also use the user device 132 to take photos of a room, and the photos can be received by the inventory identification/management system 102. The inventory identification/management system 102 can capture and analyze the image data, generate and store a product inventory for the items associated with the image data, and perform various functions with the stored information, as described in detail below.

The environment 100 can include or be associated with plural data stores that include information for the system and inventory lists generated by the system, which can be local, stored somewhere else and accessible using the network 144, generated as needed from various data sources, or some combination of these. Further, some data stores described herein may include identifiers that can be used to match or access corresponding data records or other information that are stored elsewhere, e.g. locally and/or remotely.

A data store of captured image data 112, for example, can include image data received and/or captured from various sources, such as provided to the inventory identification/management system 102 by users or received from users' computing devices. The image data that is stored can include, for example, still images, video clips, and/or image data in other formats. As an example, the captured image data 112 can include image data captured from an image 104 (e.g., of a room in the user's home) that includes a table 106a, a television 106b, and a lamp 106c. Other images 104 may include many more items (e.g., hundreds). Further, there may be multiple images 104 that include items that are located in the same space, the same room, or in some other area. In some implementations, the image 104 can be a portion of a video clip, e.g., that is made by panning a room to capture (e.g., videotape) a person's possessions in that room.

A data store of product position information 120, for example, can include metadata and position information associated with items that have been recognized as physical products by analyzing captured image data 112. For example, the data store of product position information 120 can include general information for the table 106a, the television 106b, and the lamp 106c. The general information, for example, can identify the items as a table, a television and a lamp by model number and make, respectively, and can include location information indicating that the items are located in the space and at particular locations. In some implementations, location information can include, for example, an address, a site description (e.g., My Home), a room name, a location (e.g., x- and y-coordinates) in the room, an elevation (e.g., a z-coordinate, relative to the floor), and/or other location information. The product position information 120 can also include, for example, size, dimension, color, and/or other physical features that are detectable or determinable (e.g., by retrieving specification information for a identified product from the Web or other service). The location information may also include, or be complementary to, room dimensions or other measurements input by the user or otherwise received.

A product inventory 124, for example, can include inventory information, such as information beyond the scope of information included in the data store of product position information 120. For example, the product inventory 124 can include model information (e.g., model number of the television 106b), original cost, replacement cost, insurance value, and/or other information. In some implementations, some of the information can be determined using information from the external systems 142, such as using image recognition to associate a particular item with a specific model (and thereafter retrieving other information from the external systems 142). In some implementations, the product inventory 124 can serve as a digital backup of a user's possessions. In some implementations, information in the product inventory 124 can be used to manufacture an item (e.g., through custom fabrication, three-dimensional printing, or the like), e.g., for replacement if an item is no longer available or is a one-of-a-kind item. In some implementations, the product inventory 124 can be used to re-produce the architecture and/or contents of a house or other dwelling after a fire, move or other event. In some implementations, the product inventory 124 can be used to create a syndicated space that represents the possessions in a space that one or more additional users desire to copy for their own space or develop a derivation of the syndicated space.

Space representation data 128, for example, can include information used by a user interface 135 to present a representation 134 of items in a space. For example, the representation 134 can include items 136a, 136b and 136b corresponding to the table 106a, the television 106b, and the lamp 106c, respectively.

The inventory identification/management system 102 can include plural engines, some or all of which may be combined or separate, and may be co-located or distributed (e.g., connected over the network 144). An image data capture engine 110, for example, can capture image data including one or more images or video of physical possessions of a person that occupy a space. For example, the captured image data (e.g., the image 104) can be stored in the captured image data 112.

An image data analysis engine 114, for example, can automatically analyze the captured image data 112 to recognize (116) physical products included in the image data along with other characteristics of the space. For example, using various image recognition techniques, the analysis can determine that items in the image 104 (and thus the area from which the image 104 is generated) include the table 106a, the television 106b and the lamp 106c. The image data analysis engine 114 can also automatically analyze the captured image data 112 to determine (118) a position of each recognized physical product in the space. For example, position information can identify a particular item's location in a room (e.g., identification of a particular room, position along a wall, distance from the wall, height above the floor). In some implementations, analysis of the captured image data 112 can determine, for example, the kind of object identified from an image, such as a specific model of the television 106b and the lamp 106c, and the style of the table 106a.

An inventory engine 122, for example, can automatically inventory the recognized physical products (e.g., items 106a-106c) including preparing a list of products. For example, each of the respective entries 124a-124c in the list of products can include a product name and/or identifying information and location information for where the product is located in the space. For example, the inventory engine 123 can determine inventory information that is stored in the product inventory 124, the information associated with the items 106a-106c.

An augmentation engine 125, for example, can automatically retrieve augmentation information associated with the recognized physical products and store the augmentation information in association with the list. For example, the augmentation can occur after the captured image data 112 is analyzed to recognize the associated physical products, e.g., after the inventory engine 112 has stored associated inventory information for the table 106a, the television 106b, and the lamp 106c in the product inventory 124. Augmentation information can include, for example, one or more of a model number, a source or an origin of a respective physical product, a price and/or a value of the respective physical product, specification information related to the respective product, replacement information, product description, size and dimension information, color and style information, weight information, an age and ownership date of the respective product, and warranty information. This augmentation information can be provided to a user interface with a user-selectable control to expose the augmentation information, as described below.

A representation generation engine 126, for example, can generate a representation 134 of the space including respective physical products (e.g., items 136a-136c). For example, the generated representation can be stored as space representation data 128. The information that is stored, for example, can include metadata associated with each of the physical products that is available in the product inventory 124. In some implementations, the space representation engine is configured to enable updates for a space. For example, the representation generation engine 126 may include a user interface that is configured to enable a user to relocate or re-position one or more identified products in a given space without requiring the user to repeat the process of an initial inventory. Similarly, the user interface may be configured to allow users to delete items in inventory when they have been removed from the space (again not requiring a re-peat of the inventory processing that occurs at initialization. Further, in some implementation, the representation generation engine 126 may include a update tool that operates to evaluate new image data received for a space, make a comparison to image data previously processed, and provide an updated inventory (or a query to an end user about changes to a space that have been detected).

A user interface engine 130, for example, can provide information for use by the user interface 135 for presenting the inventory. The information can be used, e.g., by the user device 132, to generate the representation 134, including respective physical products (e.g., items 136a-136c) in the space. The representation 134 represents the items in the image 104, for example, e.g., with items 136a-136c representing corresponding ones of the table 106a, the television 106b, and the lamp 106c. The user interface engine 130 can also provide information so that a metadata information popup 137 (e.g., associated with the television 106b) can be displayed in the user interface 135 when requested by the user, such as when mousing or hovering over the item 136b in the representation 134. In some implementations, the user interface engine 130 can be used for obtaining, from the user, specific item location information, such as whether an item is in a main room, on a shelf on the wall, or the nth item from the left among other items. Other metadata associated with an item can include, for example, an item's value, an item's price, a store where the item was purchased, transaction history associated with the item, model information, credit card and/or receipt information. In some implementations, the user can be prompted for additional metadata associated with an item, such as through the user interface 135.

A recommendation engine 127, for example, can generate recommendations (or suggestions) for presentation to the user. For example, the recommendations can be determined based, at least in part, on analysis performed by the image data analysis engine 114 on the captured image data 112. In some implementations, recommendations can be determined from analyzing items owned by the user and for which information is stored in the product inventory 124. Example recommendations can include one or more additional products, one or more replacement products, or one or more related products. The recommendations can suggest that the user buy a new product, such as based on information that the user owns and likes one or more related and/or complementary products. Other recommendations can include, for example, recommendations based on an existing warranty, such as to remind the user that a warranty is about to expire and that action be taken by the user. The recommendation engine 127 can provide information associated with recommendations to the user interface engine 130, e.g., for presentation to the user in the user interface 135.

A services engine 146, for example, can perform additional actions based on information known in the product inventory 124, information received from external systems 142, and/or actions that the user may elect to perform. The additional actions can relate, for example, to moving, storing, packaging or shipping items to a new space, having items packaged (e.g., in moving boxes or shipping boxes), and updating the product inventory 124 based on purchased products (e.g., by evaluating purchase history of a user, such as through credit card transaction records). Other services are also possible, such as automatically determining how many items will fit in a box, container, package or other space and determining which items are breakable and adjusting box sizes or shipping or packaging methods to account for extra packing materials or the like.

In some implementations, actions related to moving items to a new space (e.g., within the same home or to/from a storage facility) can include receiving a selection of the list or a portion of the list. For example, the user can identify items from the product inventory 124 that are to be moved, and the user can identify a different space as a destination for the move. The services engine 146 can provide information to the user interface engine 130 for generating a representation of the different space. The information can be provided, for example, after determining a layout for the recognized products in the different space based on respective locations of the recognized products in the space. The user interface engine 130 can provide instructions for use in presenting, in the user interface 135, the representation of the different space. For example, the user interface 135 can display a representation of respective physical products in the different space. The new space may be a different room in the user's home, for example, to which one or more pieces of furniture and other belongings are to be moved. In some implementations, the user interface engine 130 can provide drag-and-drop functionality so that the user can place particular items in specific places.

In some implementations, actions related to having items packaged (e.g., in moving boxes) can include receiving an indication to package one or more of the recognized products. This type of service can be provided, for example, if the user plans to move to a different city or a different home, or to place items in storage at a remote location. For example, the user can indicate, using that the table 106a, the television 106b and the lamp 106c are to be packaged for moving to a new home. Using metadata for the items stored in the product inventory 124, the services engine 146 can identify one or more containers that are sized to receive the one or more recognized products. The services engine 146 can further determine which of the one or more recognized products can be included in a respective individual container, provide instructions for packing the one or more containers, and provide a packing list or bill of materials for each individual container. In some implementations, items (e.g., in the same box or container) can be grouped such as for individual sub-assemblies of a larger item.

Figure 2:
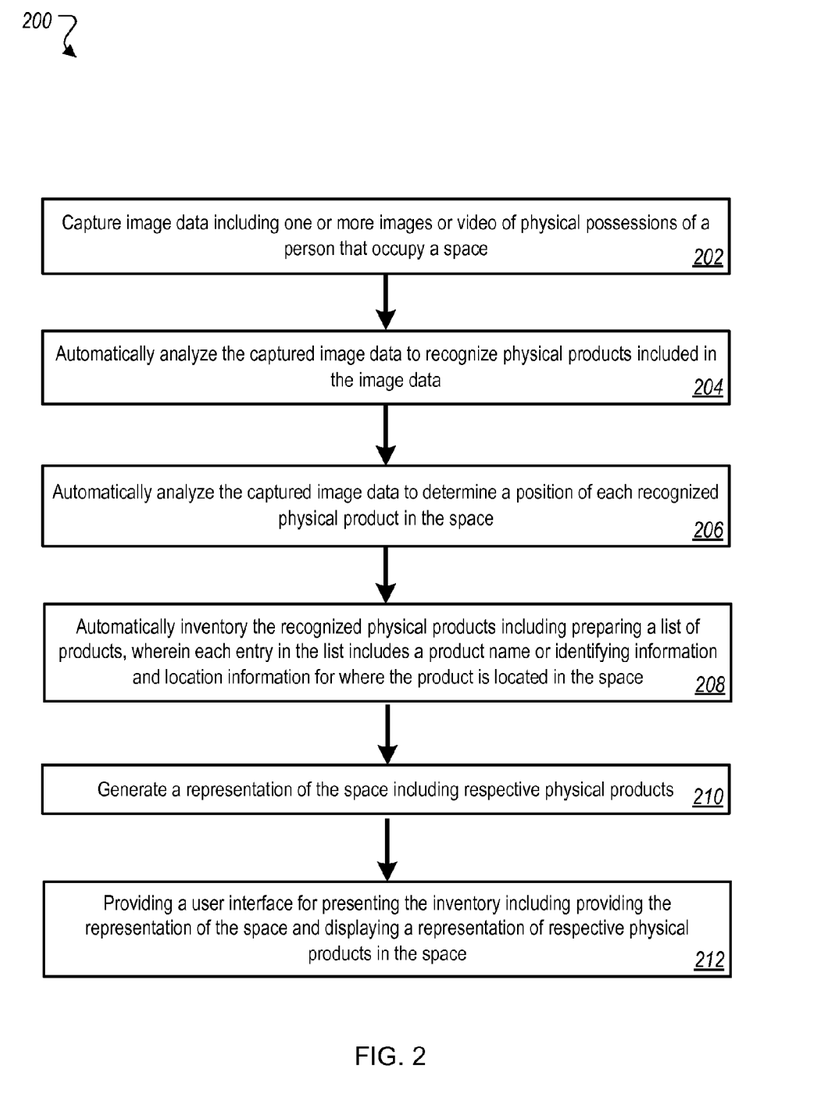
FIG. 2 is a flowchart of an example process for identifying, inventorying and managing items.

FIG. 2 is a flowchart of an example process 200 for identifying, inventorying and managing physical possessions. In some implementations, the inventory identification/management system 102 can perform steps of the process 200 using instructions that are executed by one or more processors. FIG. 1 is used to provide example structures for performing the steps of the process 200.

Image data is captured or received including one or more images or video of physical possessions of a person or business that occupy a space (202). As an example, the image data capture engine 110 can capture image data associated with the image 104 for storage as captured image data 112.

The captured image data is automatically analyzed to recognize physical products included in the image data (204). For example, the image data analysis engine 114 can automatically analyze the captured image data 112 to recognize (116) physical products (e.g., furniture, electronics, and other belongings) included in the image data.

The captured image data is automatically analyzed to determine a position of each recognized physical product in the space (206). For example, the image data analysis engine 114 can automatically analyze the captured image data 112 to determine (118) a position of each recognized physical product in the space. As a result of the analysis, for example, product position information 120 that is generated and stored can include information that identifies the items 106a-106c and their respective locations in the space (e.g., the user's family room).

In some implementations, the process 200 further includes, after the analyzing the captured image data to recognize physical products, automatically retrieving augmentation information associated with the recognized physical products and storing the augmentation information in association with the list, and providing the user interface includes providing a control to expose the augmentation information. As an example, the augmentation engine 125 can automatically retrieve augmentation information, such as from external systems 142, for use in adding metadata associated with items already stored in the product inventory 124. In some implementations, the augmentation information can include one or more of a model number, a source or an origin of a respective physical product, a price and/or a value of the respective physical product, specification information related to the respective product, replacement information, product description, size and dimension information, color and style information, weight information, an age and ownership date of the respective product, and warranty information. Information that cannot be determined automatically can be requested from the user, e.g., for manual input through the user interface 135.

In some implementations, the process 200 can further include receiving user input including an identification of a physical product and location information for where the physical product is located in the space. For example, using the user interface 135, the user can provide location information or edit/adjust information determined by the image data analysis engine 114. In another example, the image data analysis engine 114 may not be able to determine, e.g., from the image 104, what a particular object is. As such, the user can be prompted to provide missing information, including a title of the unidentifiable object and other descriptive information. In some implementations, in order to aid the user in identifying an object, the user interface 135 can display highlighted portions of the image 104 for which user input is requested.

The recognized physical products are automatically inventoried including preparing a list of products (208). Each entry in the list includes a product name or identifying information and location information for where the product is located in the space. For example, the inventory engine 122 can automatically inventory the recognized physical products (e.g., items 106a-106c) including preparing a list of products, e.g., associated with the respective entries 124a-124c. For example, the inventory engine 123 can determine inventory information that is stored in the product inventory 124, the information associated with the items 106a-106c.

In some implementations, the space is a residence, and the location information includes information for where the physical product is kept in the residence. For example, the image 104 can be an image of a room in the user's home, and the location information associated with the table 106a, the television 106b and the lamp 106c can include information that the items are located in the user's family room.

A representation of the space is generated including respective physical products (210). For example, the representation generation engine 126 can generate space representation data 128 needed for presenting the representation 134 and included items 136a-136c.

In some implementations, the process further includes storing an inventory including the list as a snapshot in association with a date of inventory and repeating the capturing, analyzing, inventorying and generating at one or more additional times including storing a new or delta snapshot in association with a date associated with a respective one of the one or more additional times. For example, components of the inventory identification/management system 102 can be used repeatedly over time to chronical stages of product inventory 124 associated with the user, each stage including a date and items that exist in inventory at that time. The information can be used, for example, to identify a user's inventory relative to a specific date.

A user interface is provided for presenting the inventory (e.g., in the form of the list) including providing the representation of the space and displaying a representation of respective physical products in the space (212). For example, the user interface engine 130 can provide instructions for use by the user device 132 to generate the representation 134 in the user interface 135, including respective physical products (e.g., items 136a-136c) in the space.

In some implementations, the process 200 can further include determining that a product included in the list needs to be replaced and determining a replacement solution, (e.g., ordering a replacement, having a replacement manufactured, or modeling a replacement). As an example, the recommendation engine 127 can periodically analyze product inventory 124 for a user to identify products (e.g., smoke detectors) that are beyond usefulness, are obsolete, and/or need or might want to be replaced. Recommendations identified by the recommendation engine 127 can be provided to the user interface engine 130 so that the recommendation can be provided to the user in the user interface 135. In some implementations, other ways of communication can be used to provide recommendations or other information to the user, such as by email, text message, and/or other communications outside of computer user interfaces. In some implementations, the recommendation engine 127 can be used to recommend a group of items to be replaced, such an entire wardrobe (e.g., if a person lost weight) or some other soft goods. In some implementations, recommendations can be made that an item of clothing, for example, can be manufactured within a more reasonable cost than purchasing the item in new condition.

In some implementations, the process 200 can further include publishing an inventory of the space to a user that is not an owner of the physical products. For example, using capabilities of the user interface engine 130 and user interface 135, a user can specify that particular items in the user's product inventory are to be assembled and provided/suggested to another person. Inventory lists can be generated, for example, to be provided for insurance or legal (e.g., divorce) proceedings, for sharing on a blog or message board, for uploading to a web site, or for generating a donation list for a charitable tax deduction.

In some implementations, the process 200 can further include providing a marketplace for viewing inventories of others. For example, using capabilities of the user interface engine 130 and user interface 135, a user can specify that particular items in the user's product inventory are to be published, e.g., for sale in an on-line or physical auction, or for inclusion in an electronic market place.

In some implementations, the process 200 can further include receiving selection of the list or a portion of the list, identifying a different space, generating a representation of the different space, determining a layout for the recognized products in the different space based on respective locations of the recognized products in the space, providing in the user interface the representation of the different space, and displaying a representation of respective physical products in the different space. For example, the user can identify items from the product inventory 124 that are to be moved to a user-designated different space. The user interface engine 130 can be used to generate a representation of the different space after determining, for example, a layout for the recognized products in the different space based on respective locations of the recognized products in the current and different spaces.

In some implementations, the process 200 can further include receiving an indication to package one or more of the recognized products, identifying one or more containers that are sized to receive the one or more recognized products, determining which of the one or more recognized products can be included in a respective individual container, providing instructions for packing the one or more containers, and providing a packing list for each individual container. For example, the services engine 146 can include services that facilitate a move by the user of one or more belongings to a different residence or a move of belongings to storage. Using metadata for the items stored in the product inventory 124, the services engine 146 can identify various boxes that are sized to hold the belongings to be moved. The services engine 146 can further determine which of the belongings are to be packed in a respective box, provide instructions for packing the boxes, and provide a packing list for each box.

In some implementations, the process 200 can further include evaluating purchase history information for the person, determining products purchased by the person, and adding purchased products to the inventory automatically after completing a purchase. For example, components of the inventory engine 122 can access external systems 142 or other sources (e.g., data provided by the user or available from the user device 132) to identify new products that the user has recently purchased. Prompts in the user interface 135, for example, can ask the user for additional information, e.g., where in the user's residence the item is to be stored.

Figure 3:
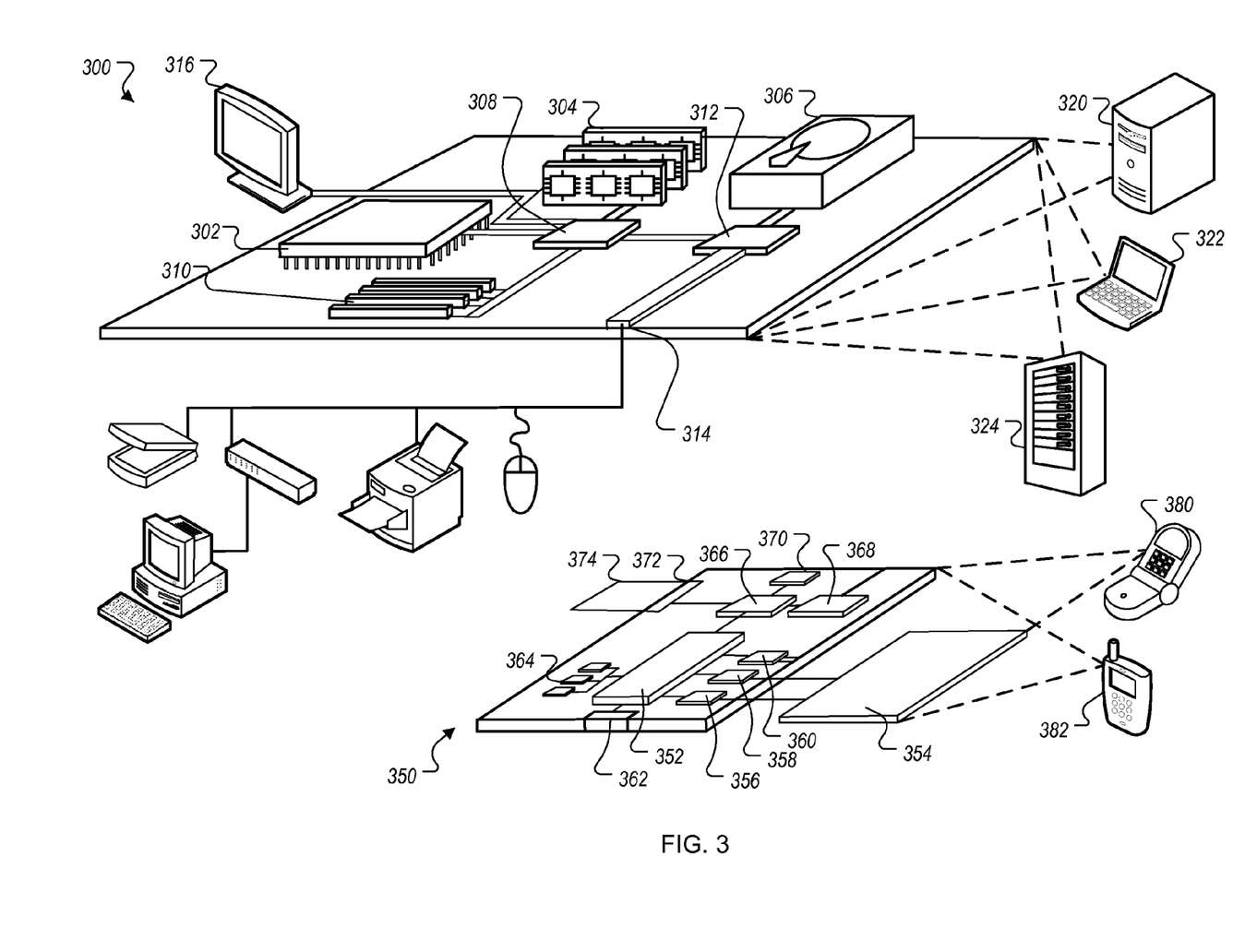
FIG. 3 is a block diagram of an example computer system that can be used to implement the methods, systems and processes described in this disclosure.

FIG. 3 is a block diagram of example computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 300 is further intended to represent any other typically non-mobile devices, such as televisions or other electronic devices with one or more processors embedded therein or attached thereto. Computing device 350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 300 includes a processor 302, memory 304, a storage device 306, a high-speed controller 308 connecting to memory 304 and high-speed expansion ports 310, and a low-speed controller 312 connecting to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed controller 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of duties is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed bus 314. The low-speed bus 314 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as computing device 350. Each of such devices may contain one or more of computing devices 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The computing device 350 may also be provided with a storage device, such as a micro-drive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the computing device 350, such as control of user interfaces, applications run by computing device 350, and wireless communication by computing device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of computing device 350 with other devices. External interface 362 may provide, for example, for wired communication (e.g., via a docking procedure) or for wireless communication (e.g., via Bluetooth® or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to computing device 350 through expansion interface 372, which may include, for example, a subscriber identification module (SIM) card interface. Such expansion memory 374 may provide extra storage space for computing device 350, or may also store applications or other information for computing device 350. Specifically, expansion memory 374 may include instructions to carry out or supplement the processes described above, and may include secure information also. Thus, for example, expansion memory 374 may be provide as a security module for computing device 350, and may be programmed with instructions that permit secure use of computing device 350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368 (e.g., a radio-frequency transceiver). In addition, short-range communication may occur, such as using a Bluetooth®, WiFi, or other such transceiver (not shown). In addition, GPS receiver module 370 may provide additional wireless data to computing device 350, which may be used as appropriate by applications running on computing device 350.

Computing device 350 may also communicate audibly using audio codec 360, which may receive spoken information from a user and convert it to usable digital information. Audio codec 360 may likewise generate audible sound for a user, such as through a speaker, e.g., in a handset of computing device 350. Such sound may include sound from voice telephone calls, may include recorded sound (e.g., voice messages, music files, etc.) and may also include sound generated by applications operating on computing device 350.

The computing device 350 may be implemented in a number of different forms, as shown in the figure. For example, it may be implemented as a cellular telephone 380. It may also be implemented as part of a smartphone 382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for identifying, inventorying and managing physical possessions, the method comprising:
    capturing image data including one or more images or video of physical possessions of a person that occupy a space;
    automatically analyzing the captured image data to recognize physical products included in the image data;
    automatically analyzing the captured image data to determine a position of each recognized physical product in the space;
    automatically inventorying the recognized physical products including preparing a list of products, wherein each entry in the list includes a product name or identifying information and particular location information for where the product is located in the space;
    generating a representation of the space including respective physical products in their particular locations in the space; and
    providing a graphical user interface for presenting the inventory including providing the representation of the space and displaying a representation of respective physical products in their particular locations in the space.

2. The method of claim 1 further comprising storing an inventory including the list as a snapshot in association with a date of inventory and repeating the capturing, analyzing, inventorying and generating at one or more additional times including storing a new or delta snapshot in association with a date associated with a respective one of the one or more additional times.

3. The method of claim 1 wherein the space is a residence, and wherein the particular location information includes information for where the physical product is kept in the residence.

4. The method of claim 1 further comprising, after the analyzing the captured image data to recognize physical products, automatically retrieving augmentation information associated with the recognized physical products and storing the augmentation information in association with the list, and wherein providing the graphical user interface includes providing a control to expose the augmentation information.

5. The method of claim 4 wherein the augmentation information includes one or more of a model number, a source or an origin of a respective physical product, a price and/or a value of the respective physical product, specification information related to the respective product, replacement information, product description, size and dimension information, color and style information, weight information, an age and ownership date of the respective product, and warranty information.

6. The method of claim 1 further comprising receiving user input including an identification of a physical product and particular location information for where the physical product is located in the space.

7. The method of claim 1 further comprising determining that a product included in the list needs to be replaced and determining a replacement solution, wherein the replacement solution is selected from the group of ordering a replacement, having a replacement manufactured, or modeling a replacement.

8. The method of claim 1 further comprising including publishing an inventory of the space to a user that is not an owner of the physical products.

9. The method of claim 8 further comprising providing a marketplace for viewing inventories of others.

10. The method of claim 1 further comprising receiving selection of the list or a portion of the list, identifying a different space, generating a representation of the different space, determining a layout for the recognized products in the different space based on respective locations of the recognized products in the space, providing in the graphical user interface the representation of the different space, and displaying a representation of respective physical products in the different space.

11. The method of claim 1 further comprising receiving an indication to package one or more of the recognized products, identifying one or more containers that are sized to receive the one or more recognized products, determining which of the one or more recognized products can be included in a respective individual container, providing instructions for packing the one or more containers, and providing a packing list for each individual container.

12. The method of claim 1 further comprising evaluating purchase history information for the person, determining products purchased by the person, and adding purchased products to the inventory automatically after completing a purchase.

13. The method of claim 1 further comprising determining one or more recommendations to provide to the person based on the analyzing, including determining one or more additional products, one or more replacement products, or one or more related products to recommend to the person.

14. A computer-readable storage medium encoding instructions for identifying, inventorying and managing physical possessions, the instruction operable to cause one or more data processing apparatus to perform operations comprising:
    capturing image data including one or more images or video of physical possessions of a person that occupy a space;
    automatically analyzing the captured image data to recognize physical products included in the image data;
    automatically analyzing the captured image data to determine a position of each recognized physical product in the space;
    automatically inventorying the recognized physical products including preparing a list of products, wherein each entry in the list includes a product name or identifying information and particular location information for where the product is located in the space;
    generating a representation of the space including respective physical products in their particular locations in the space; and providing a graphical user interface for presenting the inventory including providing the representation of the space and displaying a representation of respective physical products in their particular locations in the space.

15. The computer-readable storage medium encoding instructions of claim 14, wherein the operations further comprise storing an inventory including the list as a snapshot in association with a date of inventory and repeating the capturing, analyzing, inventorying and generating at one or more additional times including storing a new or delta snapshot in association with a date associated with a respective one of the one or more additional times.

16. The computer-readable storage medium encoding instructions of claim 14, wherein the operations further comprise, after the analyzing the captured image data to recognize physical products, automatically retrieving augmentation information associated with the recognized physical products and storing the augmentation information in association with the list, and wherein providing the graphical user interface includes providing a control to expose the augmentation information.

17. The computer-readable storage medium encoding instructions of claim 14, wherein the operations further comprise receiving user input including an identification of a physical product and particular location information for where the physical product is located in the space.

18. The computer-readable storage medium encoding instructions of claim 14, wherein the operations further comprise receiving selection of the list or a portion of the list, identifying a different space, generating a representation of the different space, determining a layout for the recognized products in the different space based on respective locations of the recognized products in the space, providing in the graphical user interface the representation of the different space, and displaying a representation of respective physical products in the different space.

19. The computer-readable storage medium encoding instructions of claim 14, wherein the operations further comprise evaluating purchase history information for the person, determining products purchased by the person, and adding purchased products to the inventory automatically after completing a purchase.

20. The computer-readable storage medium encoding instructions of claim 14, wherein the operations further comprise determining one or more recommendations to provide to the person based on the analyzing, including determining one or more additional products, one or more replacement products, or one or more related products to recommend to the person.

\* \* \* \* \*